(12) United States Patent
Leung et al.

(10) Patent No.: US 8,723,439 B2
(45) Date of Patent: May 13, 2014

(54) TRIAC DIMMABLE POWER SUPPLY UNIT FOR LED

(75) Inventors: Wa-Hing Leung, Hong Kong (CN); Kam Wah Siu, Hong Kong (CN)

(73) Assignee: Huizhou Light Engine Limited, Huizhou (CN)

( * ) Notice: Subject to any disclaimer, the term of this patent is extended or adjusted under 35 U.S.C. 154(b) by 0 days.

(21) Appl. No.: 13/696,679

(22) PCT Filed: Dec. 6, 2010

(86) PCT No.: PCT/CN2010/079474
§ 371 (c)(1),
(2), (4) Date: Jan. 22, 2013

(87) PCT Pub. No.: WO2011/137646
PCT Pub. Date: Nov. 10, 2011

(65) Prior Publication Data
US 2013/0113375 A1 May 9, 2013

Related U.S. Application Data

(60) Provisional application No. 61/332,485, filed on May 7, 2010.

(51) Int. Cl.
| | | |
|---|---|---|
| *H05B 41/16* | (2006.01) | |
| *H05B 41/24* | (2006.01) | |
| *H05B 37/00* | (2006.01) | |
| *H05B 37/02* | (2006.01) | |
| *H05B 41/28* | (2006.01) | |
| *H05B 41/36* | (2006.01) | |

(52) U.S. Cl.
CPC ............... *H05B 37/00* (2013.01); *H05B 37/02* (2013.01); *H05B 41/28* (2013.01); *H05B 41/36* (2013.01)
USPC ........... 315/247; 315/186; 315/193; 315/276; 315/287

(58) Field of Classification Search
None
See application file for complete search history.

(56) References Cited

U.S. PATENT DOCUMENTS

| 7,609,008 B1 | 10/2009 | Kohler | |
|---|---|---|---|
| 8,624,514 B2 * | 1/2014 | Kang | 315/200 R |
| 2010/0213859 A1 * | 8/2010 | Shteynberg et al. | 315/224 |

FOREIGN PATENT DOCUMENTS

| CN | 101404644 A | 4/2009 |
|---|---|---|
| CN | 101616521 A | 4/2009 |

(Continued)

OTHER PUBLICATIONS

May 27, 2013 Supplemental European Search Report from European Patent Application No. 10851015.
(Continued)

*Primary Examiner* — Anh Tran
(74) *Attorney, Agent, or Firm* — Schiff Hardin LLP

(57) ABSTRACT

A power-factor-corrected power supply adapted to supply power to one or more light emitting diodes (LEDs), comprises: a triac dimmer electrically connected between an alternating current source and a bridge rectifier; a damping circuit electrically connected between the alternating current source and the bridge rectifier; a bleeder circuit configured to conduct current between a supply terminal of the bridge rectifier and ground only when a triac in the triac dimmer is not conducting current; a fast startup circuit configured to conduct current between the supply terminal of the bridge rectifier and a voltage supply terminal of a power-factor-corrected controller when the triac dimmer is initially turned on until a supply voltage capacitor coupled to the voltage supply terminal of the power-factor-corrected controller has charged; a dimming slope control circuit configured to reduce a first voltage sensed at a current sensing terminal of the power-factor-corrected controller, such that a reduced amount of current is supplied to the one or more LEDs at a given firing angle, wherein the first voltage is representative of a current flowing through a primary winding of a flyback transformer; and a dummy load circuit provided in parallel with the one or more LEDs to draw a holding current for the triac only after the triac is turned on.

16 Claims, 15 Drawing Sheets

(56) References Cited

FOREIGN PATENT DOCUMENTS

| JP | 2002231471 A | 8/2002 |
| WO | WO2005/115058 A1 | 12/2005 |
| WO | WO2009/136328 A1 | 11/2009 |
| WO | WO2010/011971 | 1/2010 |

OTHER PUBLICATIONS

Mar. 3, 2011 International Search Report from PCT International Application No. PCT/CN2010/079474.

* cited by examiner

TRIAC DIMMABLE POWER SUPPLY UNIT FOR LED

CROSS-REFERENCE TO RELATED APPLICATION

This application claims priority to U.S. Provisional Patent Application No. 61/332,485, filed May 7, 2010, which is hereby incorporated by reference.

BACKGROUND OF THE INVENTION

The present invention relates to apparatuses and methods for supplying power to LEDs.

FIG. 1 shows a typical schematic of a conventional power-factor-corrected (PFC) flyback converter 1 for driving light emitting diodes ("LEDs"). The PFC driver circuit 1 has advantages of a low number of components, a high power factor, a constant average output current to the LEDs, and a small transformer size. In the PFC driver circuit 1, an input stage includes an AC power supply 2 coupled to an EMI filter stage comprised of an inductor and two capacitors. The input AC signal is then full wave rectified by the diode bridge rectifier 6, which produces a full wave rectified signal for input to the transformer stage 8. The output of the transformer stage 8 is output to the LED(s) with a voltage level Vout.

In this type of converter, the input capacitance, CIN, is chosen to be small so that the input voltage is very close to a rectified sinusoidal wave. A PFC controller 10 is used in this circuit to adjust the input current so that the average input current follows from the input voltage. The PFC controller 10 regulates the output current to the LEDs. The power MOSFET 12 turns on and off to control application of the voltage in the transformer stage 8 to the LED(s).

The feedback control loop provided back to the PFC controller 10 by Current and voltage comparator 14 has a narrow bandwidth so that it is not affected by the double-utility-frequency ripple that appears at the LEDs. Table 1 shows the description of pin functions of a typical PFC controller, such as an L6562AT from STMicroelectronics. See http://www-.st.com/stonline/products/literature/ds/15310.pdf, which is incorporated by reference herein. The internal structure of this known chip is shown in FIG. 2.

TABLE 1

| Name | Pin description |
|---|---|
| INV | Inverting input of the error amplifier. The information on the output voltage of the PFC pre-regulator is fed into this pin through a resistor divider. |
| COMP | Output of the error amplifier. A compensation network is placed between this pin and INV to achieve stability of the voltage control loop and ensure high power factor. |
| MULT | Main input to the multiplier. This pin is connected to the rectified mains voltage via a resistor divider and provides the sinusoidal reference to the current loop. |
| CS | Input to the pulse width modulation (PWM) comparator. The current flowing in the MOSFET is sensed through a resistor, the resulting voltage is applied to this pin and compared with an internal sinusoidal-shaped reference, generated by the multiplier, to determine MOSFET turn-off. |
| ZCD | Transformer's demagnetization sensing input for transition-mode operation. A negative-going edge triggers MOSFET turn-on. |
| GD | The gate driver output for driving power MOSFET. |
| Vcc | Supply voltage of both the signal part of the IC and the gate driver. |

It is often desired to have a dimming function in supplying power for lighting apparatuses. One commonly used dimmer is the well-known triac dimmer. However, the conventional driving circuit shown in FIG. 1 has several problems that arise when used in conjunction with a triac dimmer to provide a dimming function when driving LEDs.

A triac dimmer reduces its load power by chopping the load voltage that drives the current to the load during each half-cycle. FIG. 3 shows the load voltage waveform of triac dimmers driving incandescent lamp loads as used in a circuit such as the one shown in FIG. 1. A triac dimmer works very well for resistive loads such as incandescent lamps, but it breaks down for other types of loads.

For example, if the load supplied by a triac dimmer are switch mode power supplies driving LEDs, the sharply increasing input voltage that occurs when the triac fires at each half cycle leads to the occurrence of current ringing that reverses several times during the half cycle and causes the triac to turn off. The triac will then be triggered to turn on again by the varying input voltage, leading to flicker in the LED. FIG. 4 is a waveform showing the current ringing that occurs in the current at the output of the triac dimmer when a triac dimmer is used to drive a PFC power supply such as the one shown in FIG. 1. The ringing occurs at all firing angles, and is worst at 90 degrees. In FIG. 4, the scale in the figure is 0.25 A/division vertically, and 250 μs/division horizontally.

In this configuration, when the dimmer's triac is not on, the PFC power supply does not draw any current and the input impedance of the load becomes very high. A high input impedance causes the internal RC timing circuit of the triac dimmer to work improperly, leading to a different firing angle for each AC line cycle. This problem also occurs at all firing angles.

FIG. 5 shows the rectified input voltage waveform of PFC power supply when it is being driven by a triac dimmer, that is, the voltage across Cin in FIG. 1. As shown in FIG. 5, the low voltage portion of the voltage waveform differs from one cycle to the next cycle. In FIG. 5, the scale is 50V per division in the vertical axis, and 5 ms per division in the horizontal axis.

As shown in FIG. 1, power is provided to the PFC controller 10 via terminal Vcc. If a triac dimmer were to be used with the driver circuit 1, when the triac dimmer is set to a dimmed position, this would result in a reduced average input voltage being applied to the PFC controller 10, causing a relatively slow startup of the PFC controller 10, or may even result in the PFC controller being unable to startup. FIG. 6 is a Vcc voltage waveform of a PFC power supply during startup that shows the instability of voltage supplied to the PFC controller during startup in the half cycle, when the triac dimmer is dimmed. In FIG. 6, the scale is 5V per division in the vertical axis, and 500 ms per division in the horizontal axis.

Since the efficiency of LEDs is higher than an incandescent lamp, at a given setting of a triac dimmer, the LEDs always appears brighter than an incandescent lamp.

Finally, a triac requires a minimum holding current, typically 30 to 50 mA, to stay on during the entire half cycle. If current falls below the holding current level, or if the current reverses, the triac will turn off. In order to maintain the holding current when the output current is dimmed down at low conduction angles, a minimum loading is required at the output to avoid chaotic operation of the triac dimmer. FIG. 7 shows the rectified input voltage is not stable and causes the LEDs to flash at a very dim setting of the triac dimmer. In FIG. 7, the scale is 50V per division in the vertical axis, and 5 ms per division in the horizontal axis.

Thus, there is a need for a PFC power supply circuit that is designed to function correctly with a triac dimmer to prevent ringing, prevent inconsistent timing, have a fast startup, provide the same dimming profile as an incandescent lamp, and prevent flashing at dim settings.

BRIEF SUMMARY OF THE INVENTION

In consideration of the above, in accordance with a first aspect of the present invention, a power-factor-corrected power supply adapted to supply power to one or more light emitting diodes (LEDs), comprises: a triac dimmer electrically connected between an alternating current source and a bridge rectifier; a damping circuit electrically connected between the alternating current source and the bridge rectifier; a bleeder circuit configured to conduct current between a supply terminal of the bridge rectifier and ground only when a triac in the triac dimmer is not conducting current; a fast startup circuit configured to conduct current between the supply terminal of the bridge rectifier and a voltage supply terminal of a power-factor-corrected controller when the triac dimmer is initially turned on until a supply voltage capacitor coupled to the voltage supply terminal of the power-factor-corrected controller has charged; a dimming slope control circuit configured to reduce a first voltage sensed at a current sensing terminal of the power-factor-corrected controller, such that a reduced amount of current is supplied to the one or more LEDs at a given firing angle, wherein the first voltage is representative of a current flowing through a primary winding of a flyback transformer; and a dummy load circuit provided in parallel with the one or more LEDs to draw a holding current for the triac only after the triac is turned on.

In another aspect, the damping circuit comprises a resistor.

In another aspect, the bleeder circuit comprises a bleeder circuit transistor and a bypass resistor, the bleeder circuit being configured such that current passes through the bypass resistor when the rectified input voltage associated with the bridge rectifier is low.

In another aspect, the fast startup circuit includes a fast startup transistor that conducts an additional startup current to the voltage supply terminal of the power-factor-corrected controller until the voltage supply voltage capacitor reaches a proper operating threshold for the power-factor-corrected controller.

In another aspect, the dimming slope control circuit includes a primary current sense resistor, the dimming slope control circuit being configured to sense an averaged input voltage and attenuate a current sense voltage linearly.

In another aspect, the averaged input voltage is produced by an RC network.

In another aspect, the dimming slope control circuit makes the slope of a dimming curve of the triac dimmer steeper, such that a reduced amount of current is supplied to the one or more LEDs for a given firing angle of the triac dimmer.

In another aspect, the dummy load circuit comprises a dummy load resistor in series with a zener diode, which prevents the dummy load resistor from conducting current during startup of the power-factor-corrected power supply.

In another aspect, the damping circuit comprises first and second damping blocks, arranged in parallel to one another between the alternating current source and the bridge rectifier.

In another aspect, power-factor-corrected power supply further comprises an EMI filter at an input stage of the power-factor-corrected power supply.

In accordance with a second aspect of the present invention, a method of supplying power to one or more light emitting diodes (LEDs) using a power-factor-corrected power supply that has: a triac dimmer electrically connected between an alternating current source and a bridge rectifier, a power-factor-corrected controller that controls the power factor of power supplied to the one or more LEDs is provided. The method comprises: damping, by a damping circuit electrically connected between the alternating current source and the bridge rectifier, current ringing at the output of the triac dimmer; controlling, by a bleeder circuit provided between a supply terminal of the bridge rectifier and ground, so that current flows between the supply terminal of the bridge rectifier and ground only when a triac in the triac dimmer is not conducting current; controlling, by a fast startup circuit provided between the supply terminal of the bridge rectifier and a voltage supply terminal of the power-factor-corrected controller, so that current is conducted between the supply terminal of the bridge rectifier and the voltage supply terminal of the power-factor-corrected controller when the triac dimmer is initially turned on until a supply voltage capacitor coupled to the voltage supply terminal of the power-factor-corrected controller has charged; reducing, by a dimming slope control circuit, a first voltage sensed at a current sensing terminal of the power-factor-corrected controller, such that a reduced amount of current is supplied to the one or more LEDs at a given firing angle of the triac, wherein the first voltage is representative of a current flowing through a primary winding of a flyback transformer; and drawing, by a dummy load circuit provided in parallel with the one or more LEDs, a holding current for the triac only after the triac is turned on.

In another aspect, the bleeder circuit comprises a bleeder circuit transistor and a bypass resistor, and the controlling by the bleeder circuit controls such that current passes through the bypass resistor when the rectified input voltage associated with the bridge rectifier is low.

In another aspect, the fast startup circuit includes a fast startup transistor and the controlling by the fast startup circuit controls so as to conducts an additional startup current to the voltage supply terminal of the power-factor-corrected controller until the voltage supply voltage capacitor reaches a proper operating threshold for the power-factor-corrected controller.

In another aspect, the dimming slope control circuit includes a primary current sense resistor, and the reducing step further comprises sensing an averaged input voltage and attenuating a current sense voltage linearly.

In another aspect, the reducing step makes the slope of a dimming curve of the triac dimmer steeper, such that a reduced amount of current is supplied to the one or more LEDs for a given firing angle of the triac dimmer.

In another aspect, the dummy load circuit comprises a dummy load resistor in series with a zener diode, and the drawing step further comprises preventing the dummy load resistor from conducting current during startup of the power-factor-corrected power supply.

BRIEF DESCRIPTION OF THE DRAWINGS

The figures are for illustration purposes only and are not necessarily drawn to scale. The invention itself, however, may best be understood by reference to the detailed description which follows when taken in conjunction with the accompanying drawings in which.

DETAILED DESCRIPTION OF THE INVENTION

Figure 1:
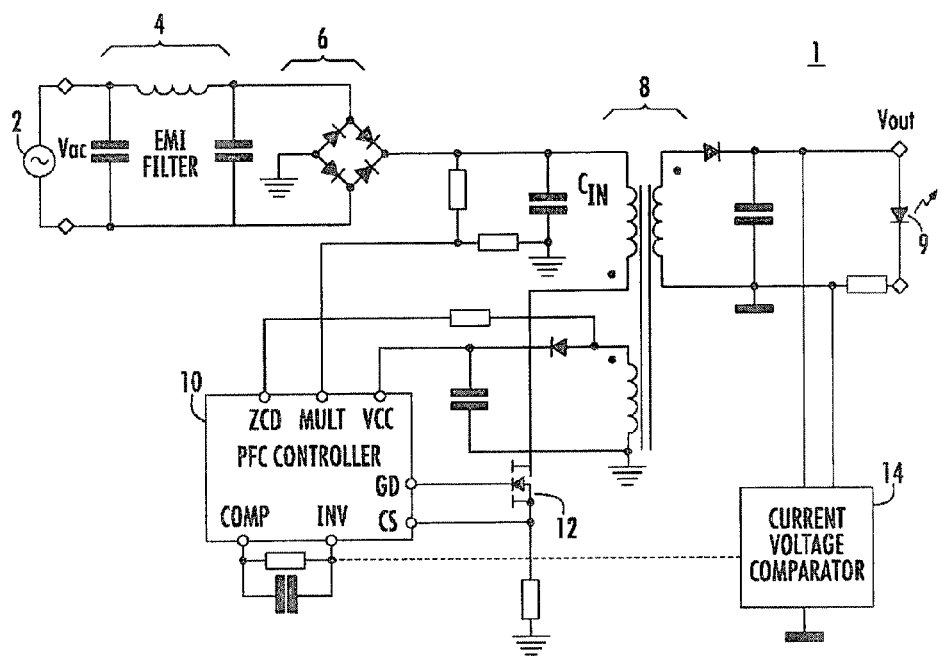
FIG. 1 is a diagram showing a conventional power-factor-converter (PFC) for driving LEDs.
Figure 2:
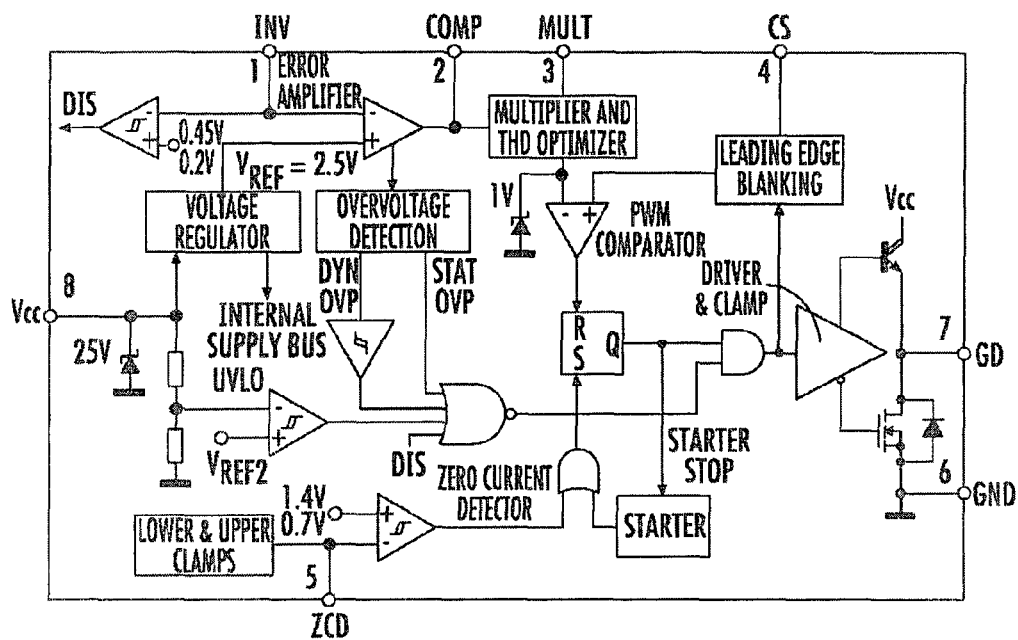
FIG. 2 is a diagram showing the internal components of a known PFC controller.
Figure 3:
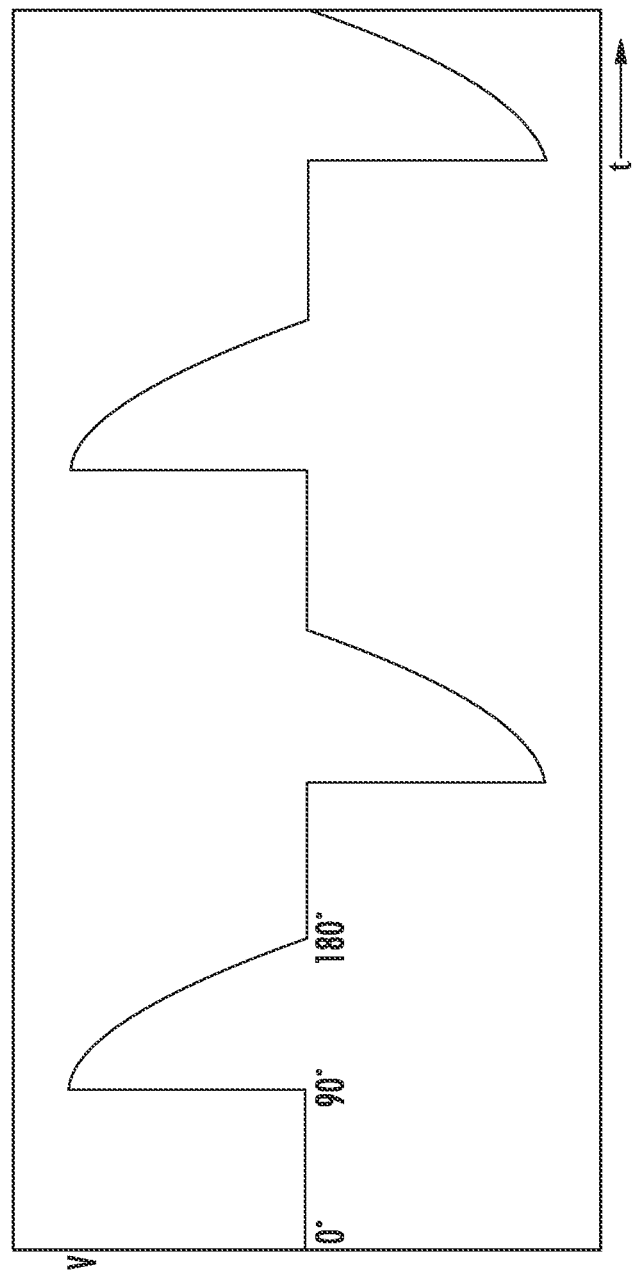
FIG. 3 shows a load voltage waveform of a triac dimmer at 90 degree firing angle.
Figure 4:
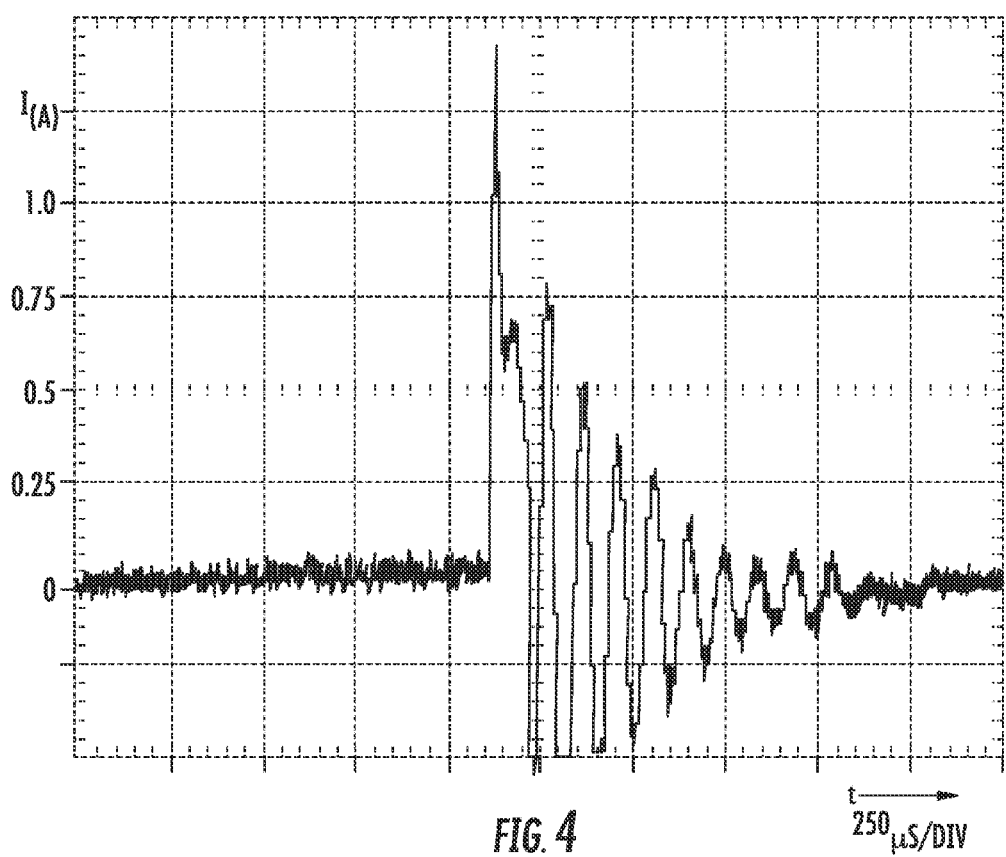
FIG. 4 shows input current ringing in a conventional PFC LED power supply.
Figure 5:
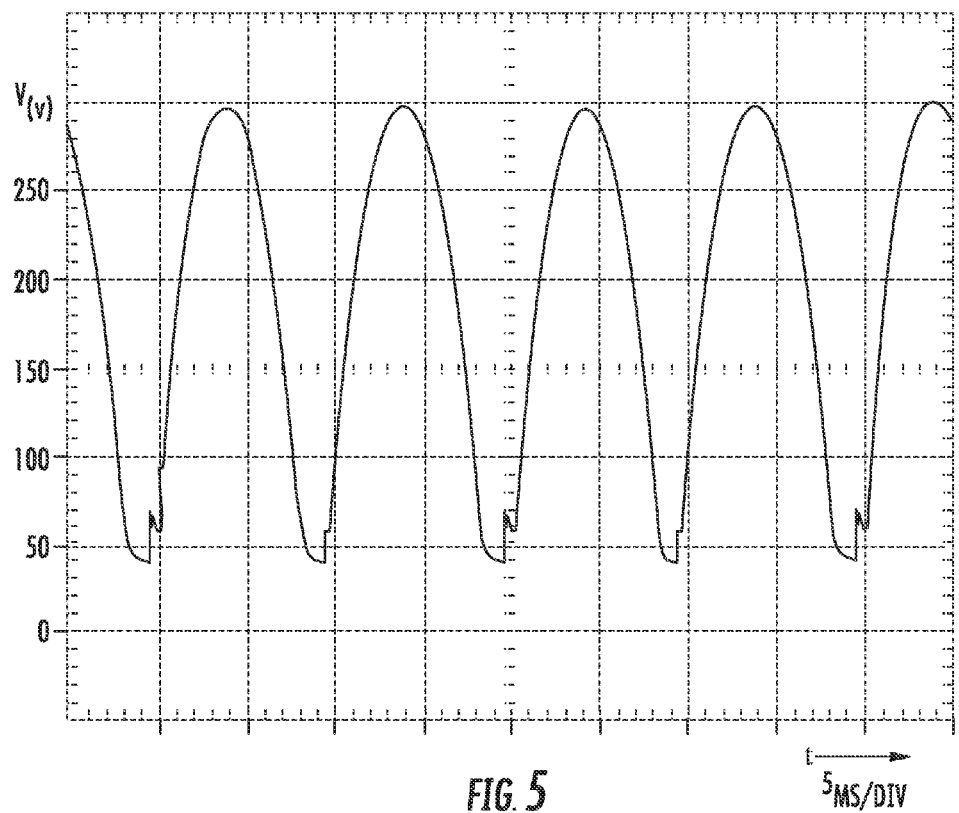
FIG. 5 shows a rectified input voltage waveform of a conventional PFC power LED supply showing inconsistent low voltages.
Figure 8:
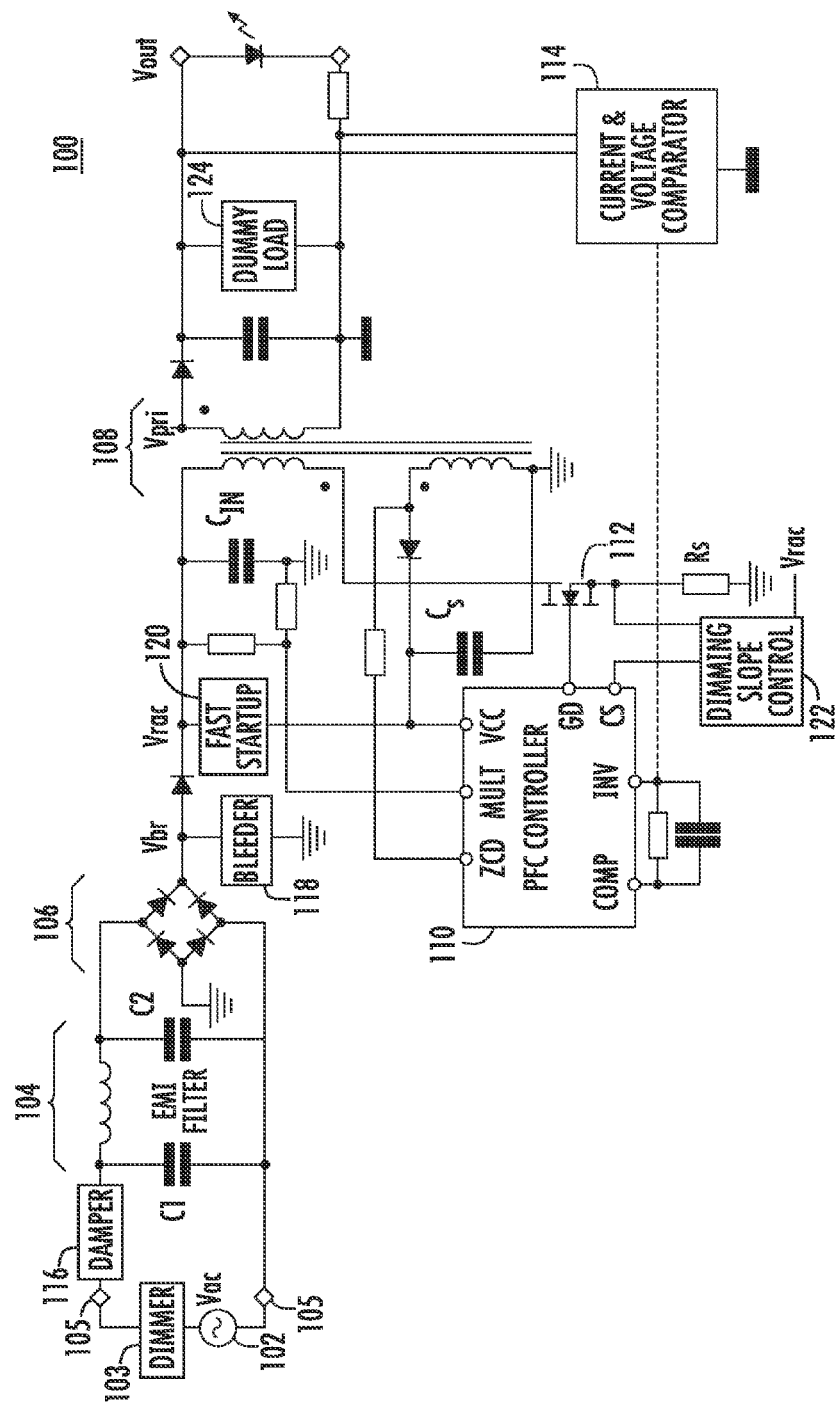
FIG. 8 is a schematic diagram of a dimmable PFC LED power supply in accordance with an aspect of the present invention.

In accordance with preferred embodiments of the present invention, additional components are added to a PFC LED power supply to improve performance, in particular with regard to the problems of the conventional power supply discussed above. For example, as shown in FIG. 8, the dimmable PFC LED power supply 100 in accordance with an embodiment of the present invention includes, in one aspect, the same elements as shown in FIG. 1, plus additional components. In order to work with a triac dimmer 103, these additional components, namely a damper 116, a bleeder circuit 118, a fast startup circuit 120, a dimming slope control 122, and a dummy load 124, are added to PFC flyback power supply, as shown in FIG. 8.

The dimmable power supply 100 in accordance with aspects of the present invention can provide deeper dimming, reduced or no flickering, quick startup even at low dimming level, compatibility with leading/trailing edge dimmers, and similar dimming characteristics of an incandescent lamp. The additional circuits are designed to tackle problems caused by triac dimmers and to improve dimming performance.

Ringing

Figure 9:
FIG. 9 shows a damper circuit for use in a dimmable PFC LED power supply in accordance with an aspect of the present invention.

To overcome the ringing problem discussed above, in accordance with an aspect of the present invention, a damper block 116 is added to damp the ringing. FIG. 9 shows an exemplary circuit implementation of the damper block 116. In accordance with this embodiment, the damper consists of a resistor with value optimized to just damp out the ringing effect while dissipating the least amount of power. While an exemplary figure of 200 ohms is illustrated, the invention is not limited to this embodiment, and can range from a few ohms to a few hundred ohms.

Figure 10:
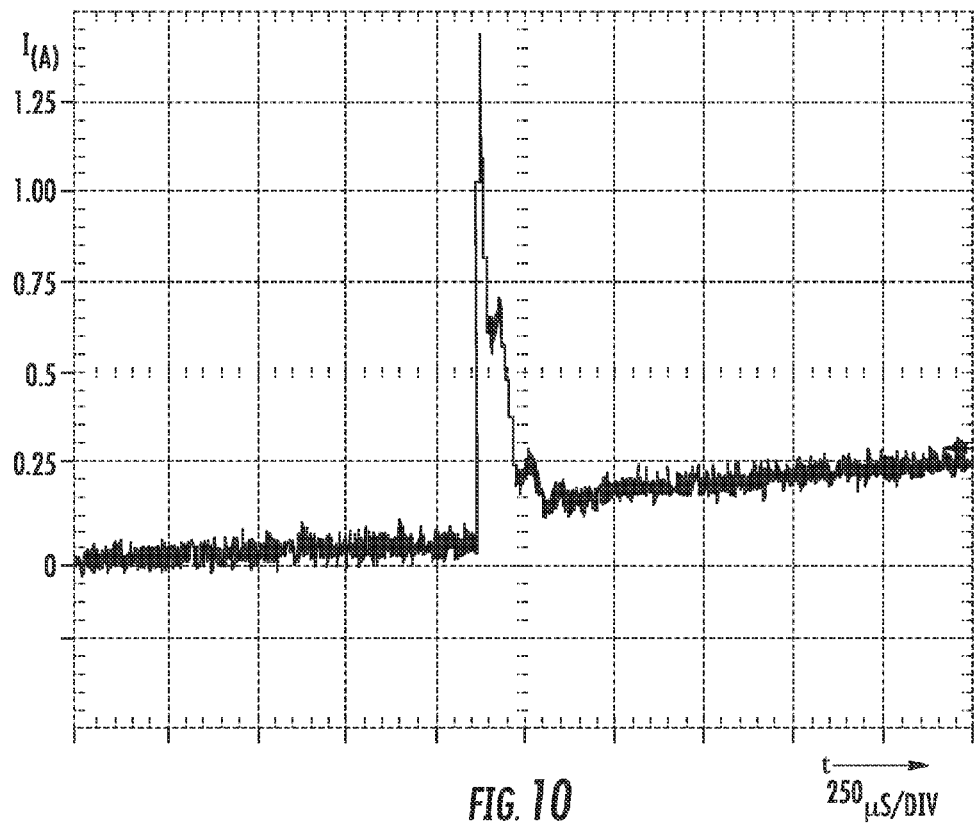
FIG. 10 shows a current waveform damped in accordance with a dimmable PFC LED power supply in accordance with an aspect of the present invention.

FIG. 10 shows an exemplary damped current waveform, measured at the output of the triac dimmer, resulting from the use of the damper block 116 shown in FIG. 9. As can be seen in FIG. 10, ringing is suppressed by the damper resistor and current can be drawn after the triac is turned on. In FIG. 10, the scale in the figure is 0.25 A/division vertically, and 250 µs/division horizontally. However, the invention is not limited to waveforms of the illustrated scale.

Figure 11A:
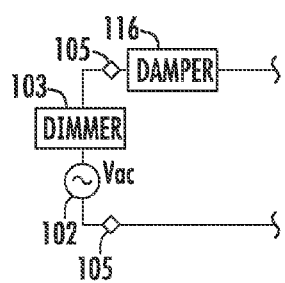
FIGS. 11A-11C show alternate ways of configuring a damper block at the input of the dimmable PFC LED power supply in accordance with an aspect of the present invention.
Figure 11B:
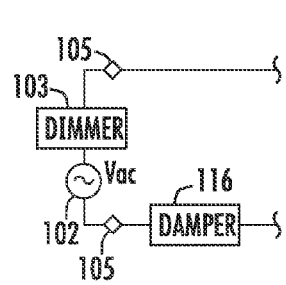
Figure 11C:
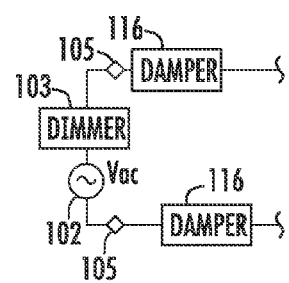

The damper block connection shown in FIG. 8 is just an example of how the damper block can be configured at the input stage. FIGS. 11A to 11C show three different ways of connecting the damper block 116, or in the case of FIG. 11C, two damper blocks 116, at the input stage of the power supply 100.

Figure 12:
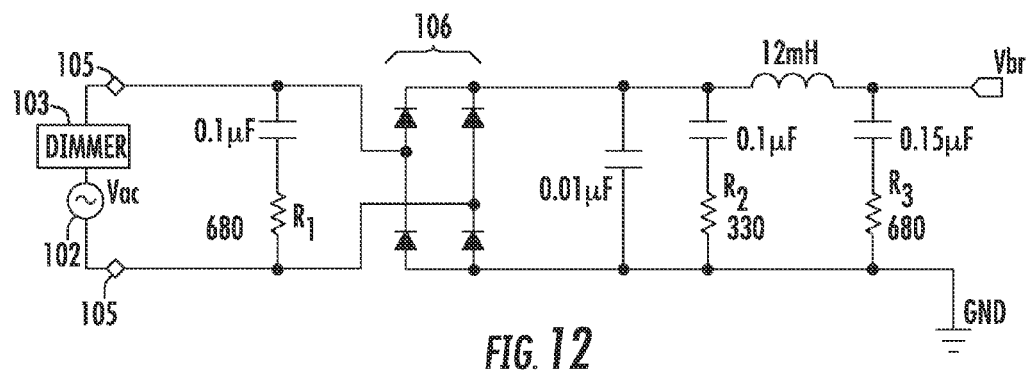
FIG. 12 is a schematic diagram of an alternative LRC damper circuit for use at an input of a dimmable PFC LED power supply in accordance with an aspect of the present invention.

FIG. 12 shows another example of an input stage including a damper circuit. In this circuit, damper resistors R1, R2 and R3 are connected to the inductor and capacitors forming the EMI filter, to increase efficiency. The particular values of the components shown in FIG. 12 are for illustrative purposes only and the component values used may vary, depending on the application and the exact design parameters, as would be understood by those of skill in the art.

Inconsistent Timing

Figure 13:
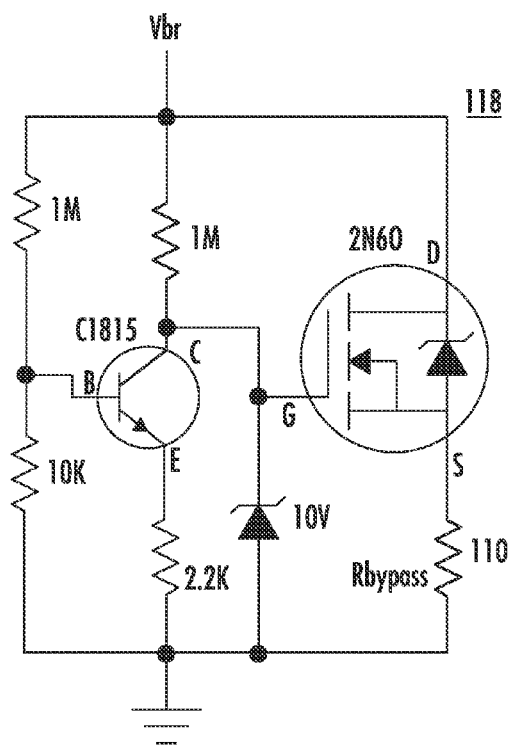
FIG. 13 is a diagram of a bleeder circuit for use at an input of a dimmable PFC LED power supply in accordance with an aspect of the present invention.

The bleeder circuit 118 acts like a resistive load for the dimmer 103 when the triac is not conducting. The bleeder circuit 118 provides a low impedance path for the triac dimmer's RC timing circuit charging current when the triac is off. FIG. 13 is an example of a bleeder circuit in accordance with an aspect of the present invention.

As illustrated in FIG. 13, a bypass resistor (Rbypass) is switched on, i.e., caused to conduct current, by transistor 2N60 to connect across the rectified input voltage when the rectified input voltage is low (which indicates the triac is off). With the bypass resistor Rbypass completing the circuit, sufficient charging current can be supplied to the internal RC timing circuit of the triac dimmer to ensure proper operation. When the rectified input voltage is high (which indicates the triac is on), Rbypass is disconnected by transistor 2N60 to minimize wasteful power dissipation. The particular values of the components shown in FIG. 13 are for illustrative purposes only and the component values used may vary, depending on the application and the exact design parameters, as would be understood by those of skill in the art.

Figure 14:
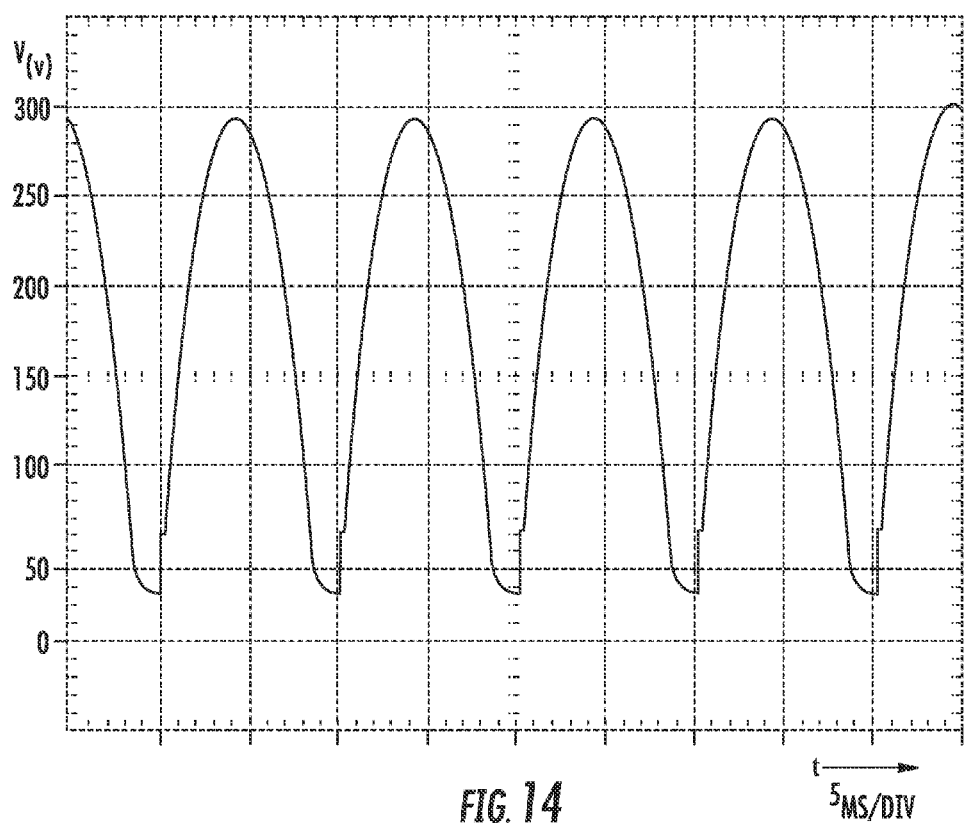
FIG. 14 shows a rectified input voltage waveform of a dimmable power supply dimmable PFC LED power supply in accordance with an aspect of the present invention.

FIG. 14 shows an exemplary rectified input voltage waveform with the addition of a bleeder circuit. As shown in FIG. 14, the low voltage portion of each cycle is identical to the low voltage portion of the other cycles. The scale in the figure is 50V per division in the vertical axis, and 5 ms per division in the horizontal axis. However, the invention is not limited to waveforms of the illustrated scale.

Fast Controller Voltage Startup Circuit

Figure 15:
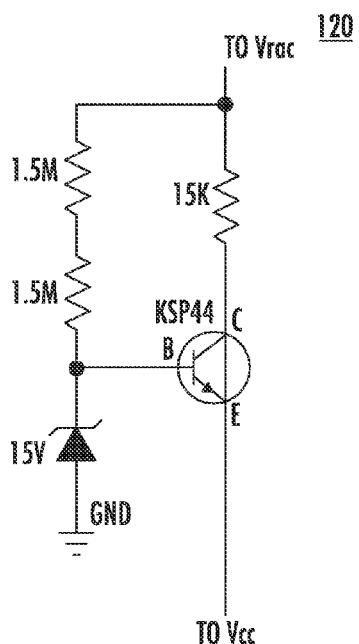
FIG. 15 is a schematic diagram of a fast startup circuit for use in a dimmable PFC LED power supply in accordance with an aspect of the present invention.

FIG. 15 shows an example of the fast startup circuit 120 in accordance with an aspect of the present invention. The fast startup circuit 120 is used to speed up the startup time of the voltage applied to PFC controller 110. The fast startup circuit boosts Vcc voltage by conducting an additional charging current, by transistor KSP44, to storage capacitor CS when the triac initially turns on, until the Vcc voltage, i.e., the voltage at storage capacitor CS, reaches a proper operating threshold for the PFC controller. Once the PFC controller is operating, CS is charged by the current generated from the flyback transformer and Vcc voltage is further boosted up to a voltage level above the Zener diode voltage. Transistor KSP44 is biasing off and Vcc voltage is supplied by the flyback transformer only. The particular values of the components shown in FIG. 15 are for illustrative purposes only and the component values used may vary, depending on the application and the exact design parameters, as would be understood by those of skill in the art.

Figure 6:
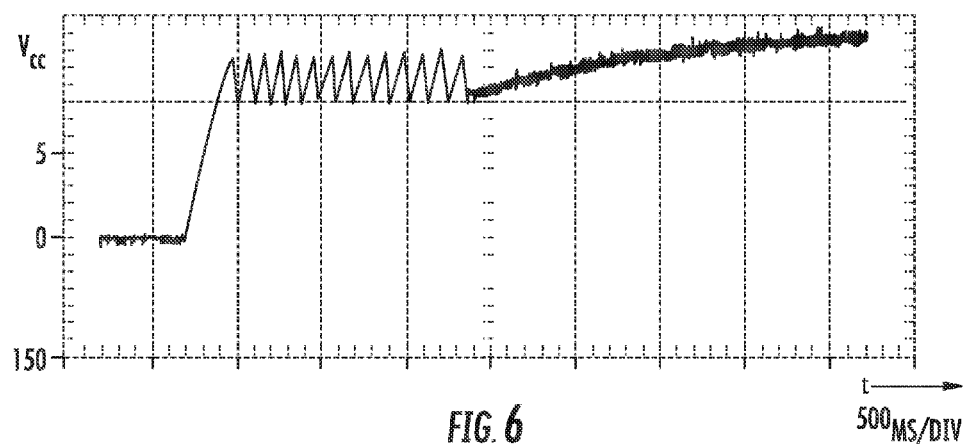
FIG. 6 shows a Vcc voltage waveform of a conventional PFC LED power supply during startup.
Figure 16:
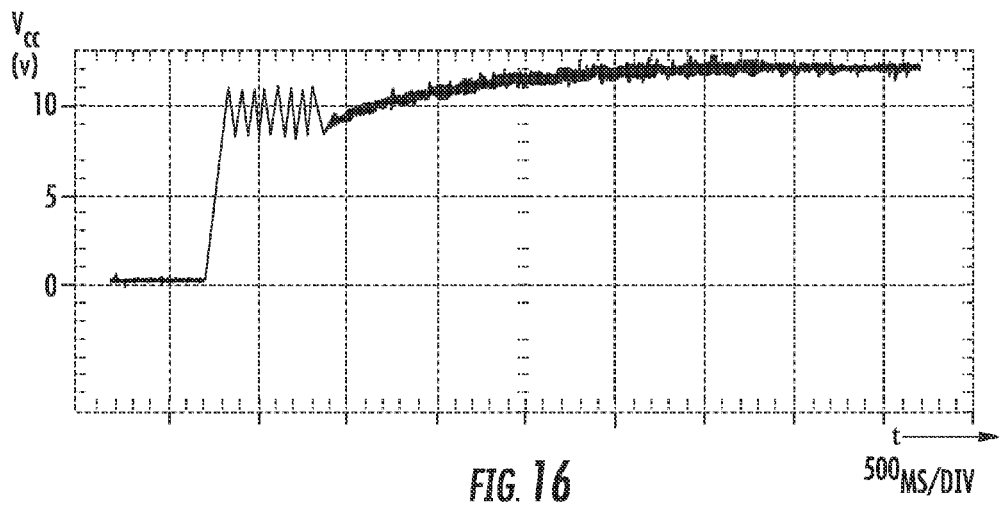
FIG. 16 is a Vcc voltage waveform of a dimmable PFC power supply when the fast startup circuit of FIG. 15 is employed.

FIG. 16 shows an exemplary Vcc voltage waveform the PFC controller in dimmable PFC power supply using the fast startup circuit as shown in FIG. 15. As shown in FIG. 16, as compared to the Vcc supplied to the PFC controller in the conventional power supply (the waveform for which is shown in FIG. 6), the startup time to a stable supply voltage to the PFC controller 110 is reduced to less than half the time than it would be without a fast startup circuit 120. In FIG. 16, the scale is 5V per division in the vertical axis, and 500 ms per division in the horizontal axis. However, the invention is not limited to waveforms of the illustrated scale.

Dimming Slope Control Circuit

Figure 17:
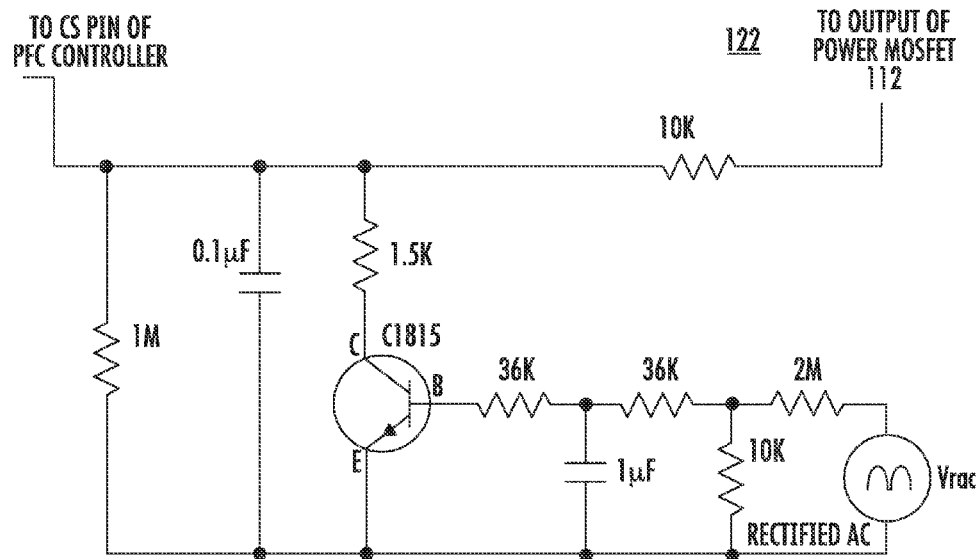
FIG. 17 is a schematic diagram of a dimming slope control circuit for use in a dimmable PFC LED power supply in accordance with an aspect of the present invention.

In order to more closely emulate the dimming characteristics of incandescent lamps, a dimming slope control block 122 is provided to the LED power supply. FIG. 17 shows an exemplary dimming slope control circuit. The voltage sensed by the primary current sense resistor Rs (shown in FIG. 8) is attenuated dynamically by the dimming slope control circuit before feeding it to the CS pin of the PFC controller 110. As the sensed voltage is attenuated, more power is drawn by the power supply and in turn is delivered to the LED. As the rectified input voltage Vrac is chopped by the triac dimmer, the average input voltage decreases. The dimming slope control circuit 122 senses the average input voltage and attenuates the current sense voltage linearly, i.e., a smaller average input voltage causes smaller attenuation on the voltage and hence less power is delivered to the LED. Transistor C1815, the 1.5K and 10K resistors from a potential divider which is used to attenuate the current sense signal. The 1M resistor and 0.1 uF capacitor is used to filter the noise generated by MOSFET 112. Rectified AC voltage is averaged by RC network consists of 2M, 10 k, two 36 k resistors and 1 uF capacitor. The averaged voltage drives transistor C1815 to control the attenuation. The dimming slope control circuit thus makes the slope of the dimming curve steeper, such that a reduced amount of current is supplied to the LED(s) at a given firing angle. The particular values of the components shown in FIG. 17 are for illustrative purposes only and the component values used may vary, depending on the application and the exact design parameters, as would be understood by those of skill in the art.

Figure 18:
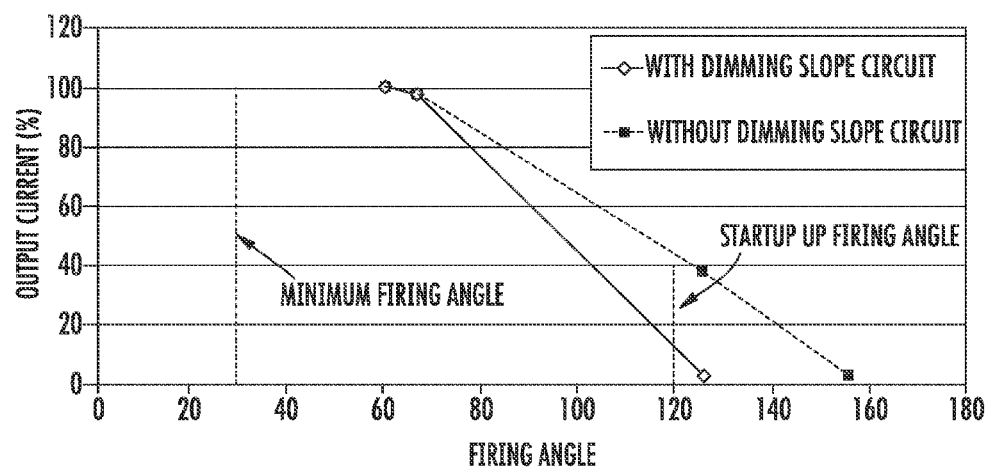
FIG. 18 shows dimming curves showing a comparison with and without the dimming control circuit.

FIG. 18 illustrates a comparison between dimming characteristics with and without the dimming slope control circuit.

Since there is an inherent minimum firing angle for a triac dimmer at maximum power output, the flat region of the dimming curve will ensure same output current to the LEDs for applications that do not employ a triac dimmer. Moreover, some triac dimmers cannot startup properly if they are set to a deeply dimmed position when power is switched on. As shown in FIG. 18, if the minimum startup firing angle for a dimmer is 120 degrees, the minimum output current at startup for PFC controller power supply without dimming slope circuit is about 45%. However, the dimming slope circuit provides the PFC controller with the ability to maintain a minimum output current that is reduced to about 10%, which is good for deep dimming.

Flicker Free Operation at Low Loads

Figure 19:
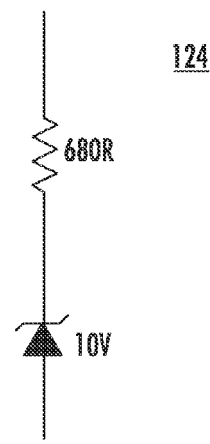
FIG. 19 is a schematic diagram of an exemplary dummy load circuit for use in a dimmable PFC LED power supply in accordance with an aspect of the present invention.

A dummy load circuit 124 provides enough load to draw the holding current required by the triac, but does not delay startup when the triac turns on. FIG. 19 shows an exemplary dummy load circuit 124. The dummy load circuit 124 in accordance with the illustrated embodiment consists of a resistor in series with a zener diode. The zener diode in the dummy load circuit 124 prevents the dummy load from conducting during startup. The particular values of the components shown in FIG. 19 are for illustrative purposes only and the component values used may vary, depending on the application and the exact design parameters, as would be understood by those of skill in the art.

Figure 7:
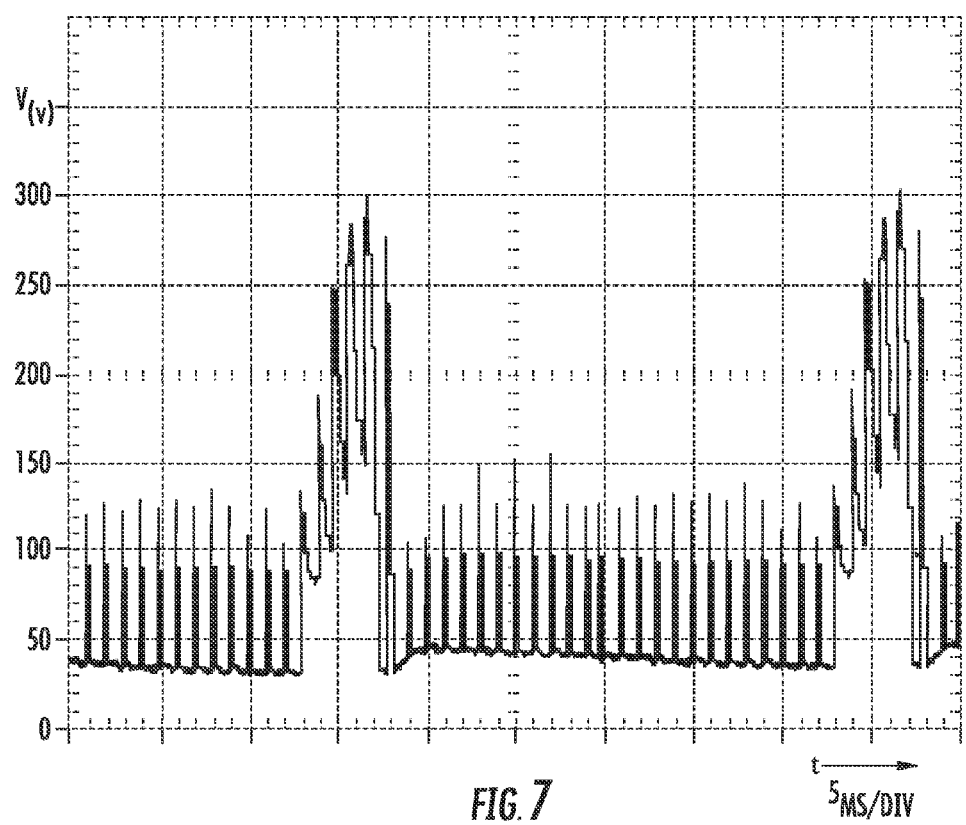
FIG. 7 shows a rectified input voltage waveform without dummy load at a dim setting.
Figure 20:
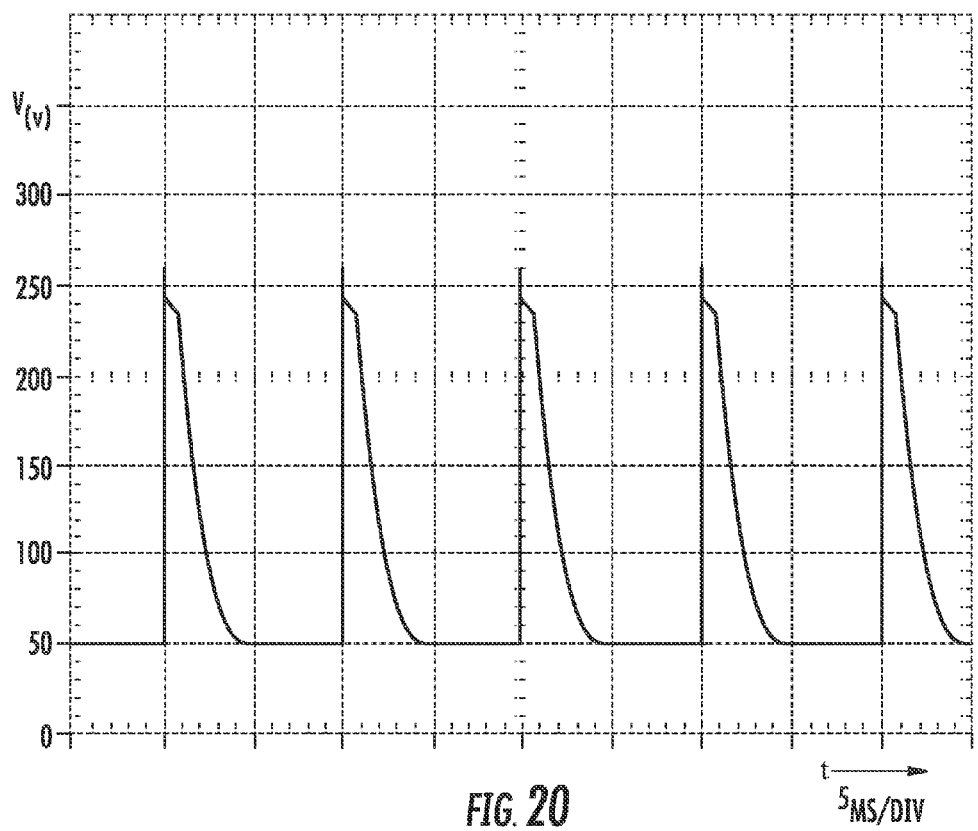
FIG. 20 shows a rectified input voltage waveform with the dummy load.

FIG. 20 shows the rectified input voltage waveform with the usage of dummy load at the output of dimmable PFC power supply. In contrast to the waveform shown in FIG. 7, it can be seen that a very stable input voltage is provided. In FIG. 20, the scale is 50V per division in the vertical axis, and 5 ms per division in the horizontal axis. However, the invention is not limited to waveforms of the illustrated scale.

Figure 21:
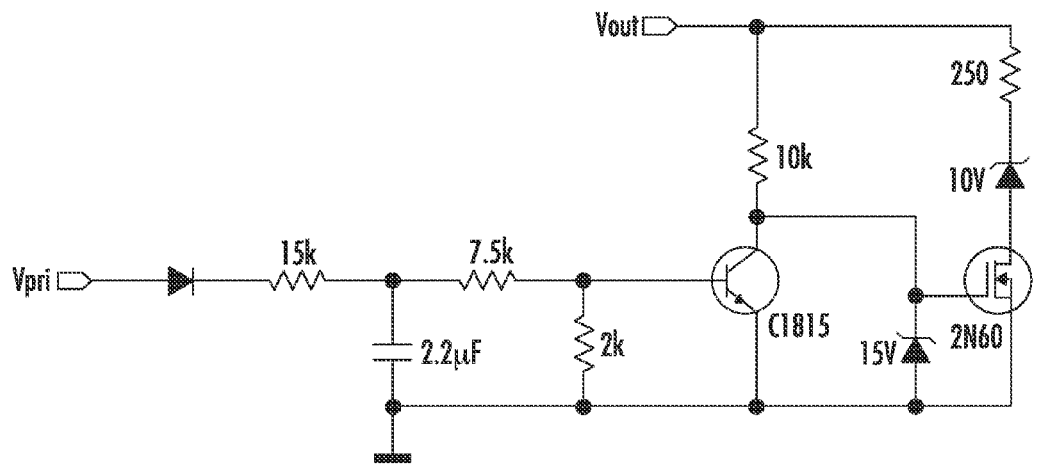
FIG. 21, shown another version of the dummy load circuit in accordance with an aspect of the present invention.

FIG. 21 shows the output stage of the power supply 100 employing an active dummy load circuit. To provide increased efficiency, the dummy load is turned off at full load condition. In a dimmed condition, the dummy load is turned on to stabilize the triac dimmer. A diode, resistors 15 k, 7.5 k, 2 k and capacitor 2.2 uF form an averaging circuit which average out the transformer reflected rectified AC voltage Vpri. When the dimmer is turned at full load position, the averaged voltage is large and drives transistor C1815 to pull the gate voltage of MOSFET 2N60 to ground. No current flows through dummy loading resistor 250 as FET 2N60 is not conducting. When the dimmer is turned to dimmed position, Vpri is phase chopped and is not large enough to turn on transistor C1815. MOSFET 2N60 is biased to turn on by resistor 10K and zener diode 15V. Dummy load resistor 250 is now conducting to provide enough load required by the triac.

The provision of the five additional components—a damper, a bleeder circuit, a fast startup circuit, a dimming slope control and a dummy load—work together to provide new features for a PFC dimmable power supply. Features such as deeper dimming, no flickering, quick startup even at low dimming level, compatibility with leading/trailing edge dimmers, and similar dimming characteristics of incandescent lamp take advantage of the interaction of all five components to ensure proper operation of triac during the whole line cycle. It is noted that the circuit implementations of the functional blocks shown in previous figures are for reference only. The functional blocks can be built with other circuits with similar functions.

The dimmable PFC power supply can be used for driving bare LED string, i.e., no electronic components other than LEDs should be connected to the output of the power supply.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power-factor-corrected power supply adapted to supply power to one or more light emitting diodes (LEDs), comprising:
    a triac dimmer electrically connected between an alternating current source and a bridge rectifier;
    a damping circuit electrically connected between the alternating current source and the bridge rectifier;
    a bleeder circuit configured to conduct current between a supply terminal of the bridge rectifier and ground only when a triac in the triac dimmer is not conducting current;
    a fast startup circuit configured to conduct current between the supply terminal of the bridge rectifier and a voltage supply terminal of a power-factor-corrected controller when the triac dimmer is initially turned on until a supply voltage capacitor coupled to the voltage supply terminal of the power-factor-corrected controller has charged;
    a dimming slope control circuit configured to reduce a first voltage sensed at a current sensing terminal of the power-factor-corrected controller, such that a reduced amount of current is supplied to the one or more LEDs at a given firing angle, wherein the first voltage is representative of a current flowing through a primary winding of a flyback transformer; and
    a dummy load circuit provided in parallel with the one or more LEDs to draw a holding current for the triac only after the triac is turned on.

2. The power-factor-corrected power supply according to claim 1, wherein the damping circuit comprises a resistor.

3. The power-factor-corrected power supply according to claim 1, wherein the bleeder circuit comprises a bleeder circuit transistor and a bypass resistor, the bleeder circuit being configured such that current passes through the bypass resistor when the rectified input voltage associated with the bridge rectifier is low.

4. The power-factor-corrected power supply according to claim 1, wherein the fast startup circuit includes a fast startup transistor that conducts an additional startup current to the voltage supply terminal of the power-factor-corrected controller until the voltage supply voltage capacitor reaches a proper operating threshold for the power-factor-corrected controller.

5. The power-factor-corrected power supply according to claim 1, wherein the dimming slope control circuit includes a primary current sense resistor, the dimming slope control circuit being configured to sense an averaged input voltage and attenuate a current sense voltage linearly.

6. The power-factor-corrected power supply according to claim 5, wherein the averaged input voltage is produced by an RC network.

7. The power-factor-corrected power supply according to claim 6, wherein the dimming slope control circuit makes the slope of a dimming curve of the triac dimmer steeper, such that a reduced amount of current is supplied to the one or more LEDs for a given firing angle of the triac dimmer.

8. The power-factor-corrected power supply according to claim 1, wherein the dummy load circuit comprises a dummy load resistor in series with a zener diode, which prevents the dummy load resistor from conducting current during startup of the power-factor-corrected power supply.

9. The power-factor-corrected power supply according to claim 1, wherein the damping circuit comprises first and second damping blocks, arranged in parallel to one another between the alternating current source and the bridge rectifier.

10. The power-factor-corrected power supply according to claim 1, further comprising an EMI filter at an input stage of the power-factor-corrected power supply.

11. A method of supplying power to one or more light emitting diodes (LEDs) using a power-factor-corrected power supply that has: a triac dimmer electrically connected between an alternating current source and a bridge rectifier, a power-factor-corrected controller that controls the power factor of power supplied to the one or more LEDs, the method comprising:
    damping, by a damping circuit electrically connected between the alternating current source and the bridge rectifier, current ringing at the output of the triac dimmer;
    controlling, by a bleeder circuit provided between a supply terminal of the bridge rectifier and ground, so that current flows between the supply terminal of the bridge rectifier and ground only when a triac in the triac dimmer is not conducting current;
    controlling, by a fast startup circuit provided between the supply terminal of the bridge rectifier and a voltage supply terminal of the power-factor-corrected controller, so that current is conducted between the supply terminal of the bridge rectifier and the voltage supply terminal of the power-factor-corrected controller when the triac dimmer is initially turned on until a supply voltage capacitor coupled to the voltage supply terminal of the power-factor-corrected controller has charged;
    reducing, by a dimming slope control circuit, a first voltage sensed at a current sensing terminal of the power-factor-corrected controller, such that a reduced amount of current is supplied to the one or more LEDs at a given firing angle of the triac, wherein the first voltage is representative of a current flowing through a primary winding of a flyback transformer; and
    drawing, by a dummy load circuit provided in parallel with the one or more LEDs, a holding current for the triac only after the triac is turned on.

12. The method according to claim 11, wherein the bleeder circuit comprises a bleeder circuit transistor and a bypass resistor, and the controlling by the bleeder circuit controls such that current passes through the bypass resistor when the rectified input voltage associated with the bridge rectifier is low.

13. The method according to claim 11, wherein the fast startup circuit includes a fast startup transistor and the controlling by the fast startup circuit controls so as to conducts an additional startup current to the voltage supply terminal of the power-factor-corrected controller until the voltage supply voltage capacitor reaches a proper operating threshold for the power-factor-corrected controller.

14. The method according to claim 11, wherein the dimming slope control circuit includes a primary current sense resistor, and the reducing step further comprises sensing an averaged input voltage and attenuating a current sense voltage linearly.

15. The method according to claim 14, wherein the reducing step makes the slope of a dimming curve of the triac dimmer steeper, such that a reduced amount of current is supplied to the one or more LEDs for a given firing angle of the triac dimmer.

16. The method according to claim 11, wherein the dummy load circuit comprises a dummy load resistor in series with a zener diode, and the drawing step further comprises preventing the dummy load resistor from conducting current during startup of the power-factor-corrected power supply.

* * * * *